Patented Aug. 26, 1947

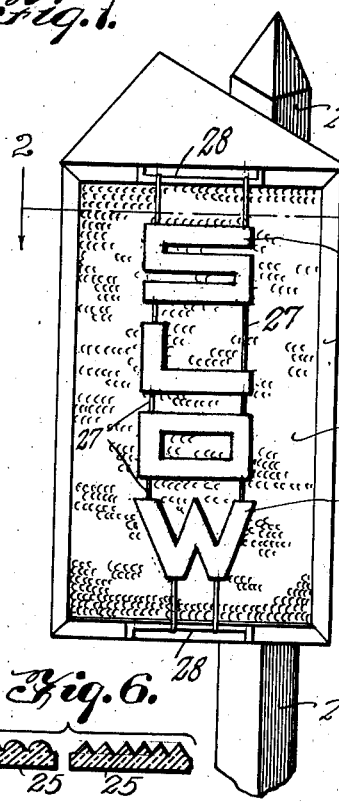
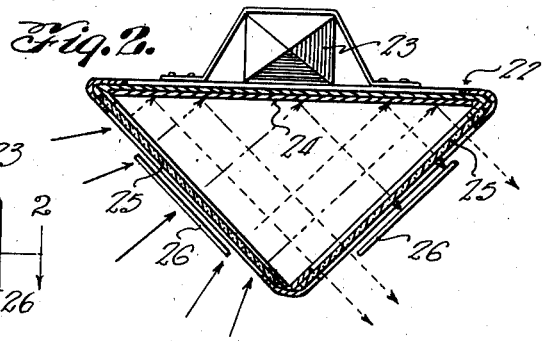
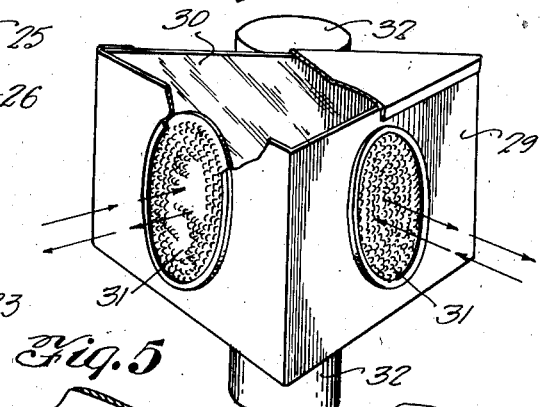
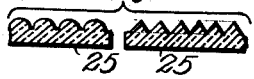

2,426,163

UNITED STATES PATENT OFFICE 2,426,163

LIGHT REFLECTING SIGN

Jack J. Booth, Dallas, Tex.

Application April 19, 1943, Serial No. 483,595

3 Claims. (Cl. 40—130)

This invention relates to directional and warning signalling apparatus and it has particular reference to light reflecting signals adapted for the direction and warning for both land and aerial traffic.

The principal object of the invention is to provide a vehicular traffic control signal whose disposition at street intersections is such that the beam of the headlights of a vehicle approaching the intersection will be reflected through light dispersing lenses and observed by the operator of another vehicle approaching the intersection at right angles to the first but whose presence except for the reflected light would be unknown to the operator of the first vehicle, hence warning both operators to reduce their respective speeds or stop their vehicles at the intersection.

Another object of the invention is to provide a reflection signal of the character set forth, optionally provided with warning indicia, consisting of letters associated to define significant words of warning, such as "Slow," "Stop" or the like and which are removably or interchangeably suspended in spaced relation to the inner or outer surfaces of the light dispersing lenses attending the reflecting surfaces so that they will be reflected by the latter and silhouetted onto for visibility through one lens when the headlights of a vehicle impinge the opposite lens, to be observed by the operator of another vehicle whose course intersects, yet will not be visible to the operator of the first vehicle.

With the foregoing objects as paramount, the invention has particular reference to certain features of accomplishment, to become manifest as the description proceeds, taken in connection with the accompanying drawings, wherein:

Figure 1 is a perspective view of the reflective principle employed by the invention to produce a land traffic signal.

Figure 2 is a transverse sectional view on line 2—2 on Figure 1.

Figure 3 is a cut-a-way view of a modified form of Figure 1, showing the manner of suspending the warning signal therein.

Figure 4 is a modification of the invention, showing a simplified form of intersection signal, and Figure 5 is a diagrammatic view in perspective, showing a street intersection equipped with the signals illustrated in Figures 1 to 5.

Figure 6 is a sectional view of a fragment of types of light accumulating and dispersing glass used with the invention.

In continuing with a more detailed description of the drawing, it is to be observed that a single reflecting surface is employed but through the use of prismatic pickup glass lenses, disposed at angles of 90° with respect to each other and 45° to said reflecting surface, a signal is produced which is automatic in the sense that a motorist's headlight beam projected onto the reflecting surface through one lens is reflected thereby through the companion lens at right angles, to serve as an illuminated warning to another motorist approaching the intersection at right angles of the presence of another vehicle, giving both ample time to decrease their speeds or stop at the intersection.

Referring to Figure 1, it will be noted that a three sided body 22 is provided and mounted on a post 23. In one side of the body, a mirror 24 is mounted while the other two sides are of so called prismatic pickup glass 25 or at least a translucent material having the quality to intensify and disperse light rays.

It is apparent that a light beam directed onto the mirror 24 through one glass 25 will be reflected by the mirror through the opposite glass 25 at right angles and by virtue of the dispersive quality of the glass, combined with the color thereof, the warning afforded by the light is much more effective than if the motorist were required to rely upon his own judgment of distances and circumstances by observing the headlight beam of an approaching vehicle which he probably cannot see or hear, to determine its speed or distance from him.

In addition to the warning afforded by simple illumination, the invention provides a word signal consisting of opaque letters 26, which are suspended one above the other by wires 27 and which, in Figures 1 and 2 define the word "Slow." This combination of letters is suspended from a support 28 outside of each of the glass panels 25 and each word signal is spaced slightly from the glass, as shown in Figure 2. The type of glass employed, preferably that known to the trade as "Diffusex," and as shown in Figure 6, is capable of wide dispersion of light directed thereagainst such as may be projected from an automobile headlamp. It is obvious that while an image presented by the set of letters suspended over one glass panel 25 reflected by the surface 24 will be intercepted and rendered illegible from the opposite side by the set of letters over the companion panel 25, a certain amount of light will filter under the letters first impinged by the light beam and will, after being reflected by the mirror 24, illuminate the glass of the companion panel sufficiently to silhouette the letters overlying the face of said companion panel. The wording of letter signals may be different. One may spell "Stop" and the other "Slow" but in any case, the object is to display to an approaching driver a light signal accompanied by a word signal, provided of course, that another driver is approaching the intersection at such an angle that his headlights will silhouette the letters confronting him.

In Figure 3 is shown a modified form of the signal just described and shown in Figures 1 and 2. In the latter form, similar reference numerals are used and the chief difference lies in the fact that the letters 26, defining the word signal are disposed on the inside of the glass panels 25 and only one set of letters are employed, that is to say, only one word signal is used and the manner of suspending the word signal and its spacing relative to the glass panel is the same as in the preceding forms. When a light beam penetrates the glass 25 to which the letters are adjacent, the image of the latter is projected onto the mirror 24 and is reflected therefrom and projected through the companion glass to be discernable by traffic approaching the signal from a different direction on another street.

Obviously, the word signal may be changed to afford other warnings or notices as desired such as directions, arrows or similar indicia with which street and highway traffic is governed.

In Figure 4 is shown a simplified form of the invention just described, and which consists of a triangular body or housing 29, one side being provided with a mirror 30 while the other two sides, which are disposed at relative angles of 90° have circular openings therein covered with lenses 31 of prismatic pickup glass. The signals are mounted on posts 32, as exemplified in Figure 5.

As a vehicle 33 approaches along the street D, its headlights will be directed into the mirror 30 and reflected thereby at right angles along street E to become visible to the motorist in vehicle 34, thereby warning him of the approach of vehicle 33 and vice versa. An identical signal is mounted on the corner diagonally across from the signal just described.

Referring again to Figure 5 as a further example and assuming that street D is a side street intersecting the busier street E. The lens in the signal confronting the car 33 may be of plain red glass having no light pickup qualities while the lens confronting the car 34 is of prismatic or light pickup glass. Such an arrangement will afford the driver of car 33 with a signal to stop or slow down while the driver of car 34 will not receive nor will he need a signal inasmuch as street E is an arterial thoroughfare and traffic thereon has the right-of-way over that on street D. Various combination of color may be adapted as may be suited in mounting the lenses.

Manifestly, the construction as shown and described is capable of some modification and such modification as may be construed to fall within the scope and meaning of the appended claims is also considered to be within the spirit and intent of the invention.

What is claimed is:

1. In a traffic signal, the combination comprising a substantially triangular casing having two sides disposed at relative right angles consisting of light accumulating and dispersing glass, a reflecting surface on the third side of said casing, a legend consisting of opaque letters suspended vertically over but spaced outwardly from each of the glass sides of said casing to cause said letters to appear darker against the illuminated background and whereby the light from a source confronted by one legend will filter thereunder to be diffused by the adjacent glass, reflected by said reflecting surface and become visible through the companion glass to silhouette the legend thereover.

2. In a traffic signal, the combination comprising a multisided casing, two of the sides being of light accumulating and diffusing glass at angles of 90° and a third consisting of a reflector at an angle of 45° to said sides and an opaque legend suspended in front of but spaced from each of said glass sides, under which light emanating from a source confronted by a legend will filter to present the opposite legend in bold relief, said light being diffused to become visible through a companion glass, as reflected by said reflector, to silhouette the overlying legend of said latter glass.

3. In a traffic signal, the combination comprising a substantially triangular casing having two sides of light accumulating and diffusing glass disposed at angles of 90° and a third reflecting side at 45° to said first sides and an opaque warning legend in spaced relation to one glass side to intercept in part a light beam directed against the companion glass by said reflecting side to silhouette its image on said first glass for visibility through said companion glass side.

JACK J. BOOTH.

REFERENCES CITED

The following references are of record in the file of this patent:

UNITED STATES PATENTS

| Number | Name | Date |
|---|---|---|
| 59,438 | Morawetz | Nov. 6, 1866 |
| 1,632,254 | Vinogradov | June 14, 1927 |
| 1,933,003 | Arthuys | Dec. 5, 1933 |
| 1,515,939 | Edwards | Nov. 18, 1924 |
| 1,651,301 | Stewart et al. | Nov. 29, 1927 |
| 2,297,387 | Biseo | Sept. 29, 1942 |
| 1,249,795 | McGrath | Dec. 11, 1917 |
| 1,994,016 | Decker | Mar. 12, 1935 |
| Re. 18,166 | Stimson | Aug. 28, 1931 |
| 123,324 | Bell et al. | Feb. 6, 1872 |
| 1,655,891 | Boots et al. | Jan. 10, 1928 |
| 1,696,878 | Bliss | Dec. 25, 1928 |
| 1,510,049 | Fair | Sept. 30, 1924 |
| 1,795,126 | Higgins | Mar. 3, 1931 |

FOREIGN PATENTS

| Number | Country | Date |
|---|---|---|
| 2,630 | Australia | July 2, 1926 |
| 627,986 | France | June 20, 1927 |